RECIPROCATING CONVEYORS

Filed Oct. 29, 1962 4 Sheets-Sheet 1

INVENTORS.
KENNETH M. ALLEN
CHESTER H. HARPER
BY
BUCKHORN, BLORE, KLARQUIST & SPARKMAN
ATTORNEYS

RECIPROCATING CONVEYORS

Filed Oct. 29, 1962 4 Sheets-Sheet 2

INVENTORS.
KENNETH M. ALLEN
CHESTER H. HARPER
BY
BUCKHORN, BLORE, KLARQUIST & SPARKMAN
ATTORNEYS

RECIPROCATING CONVEYORS

Filed Oct. 29, 1962 4 Sheets-Sheet 3

*INVENTORS.*
*KENNETH M. ALLEN*
*CHESTER H. HARPER*
*BY*
*BUCKHORN, BLORE, KLARQUIST & SPARKMAN*
*ATTORNEYS*

INVENTORS.
KENNETH M. ALLEN
CHESTER H. HARPER
BY
BUCKHORN, BLORE, KLARQUIST & SPARKMAN
ATTORNEYS

United States Patent Office 3,184,044
Patented May 18, 1965

3,184,044

RECIPROCATING CONVEYORS

Kenneth M. Allen and Chester H. Harper, Newberg, Oreg., assignors to Allen-Harper, Inc., Portland, Oreg., a corporation of Oregon Filed Oct. 29, 1962, Ser. No. 233,730
7 Claims. (Cl. 198—221)

This invention relates to a reciprocating conveyor, and more particularly to conveyors for feeding containers to a filling station and for vibrating the containers while they are being filled to pack filling material in the containers.

An object of the invention is to provide ratchet-type conveyors for advancing containers.

Another object of the invention is to provide conveyors which are adapted to feed containers therealong in the absence of undue resistance to movement of the conveyor and then to slip relative to the containers without damage thereto.

Another object of the invention is to provide ratchet-type conveyors for advancing containers along predetermined paths.

A further object of the invention is to provide a conveyor for advancing containers to a position in which material is supplied to the containers to fill them together with a mechanism for vibrating the container being filled and settle the material therein.

The invention provides a conveyor having a supporting portion, together with a driving bar slidable along an article guideway and a drag bar frictionally engaging a stationary portion along with a dog and pin-and-slot means connecting the dog to one of the bars and fixed pivot means connecting the dog to the other portion. Means are provided for reciprocating the drive bar along the guideway to pull the drag bar in movement in one direction, and the driving bar pushes the driven bar in the opposite direction after the dog has been swung into the track. There also may be provided a filling station near one end of the path and means for vibrating a container at that end of the path to settle material being supplied to the container.

A complete understanding of the invention may be obtained from the following detailed description of conveyors forming specific embodiments thereof, when read in conjunction with the appended drawings, in which.

Figure 1:
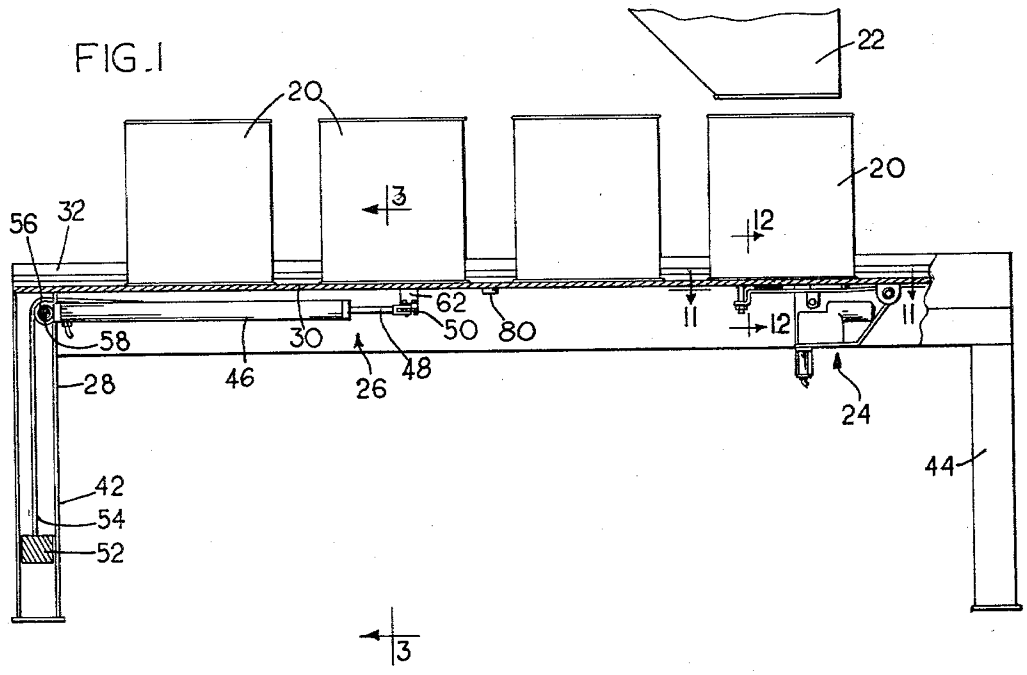
FIG. 1 is a front elevation view of a conveyor forming one embodiment of the invention with portions thereof broken away and shown in section to more clearly illustrate the structure thereof.
Figure 2:
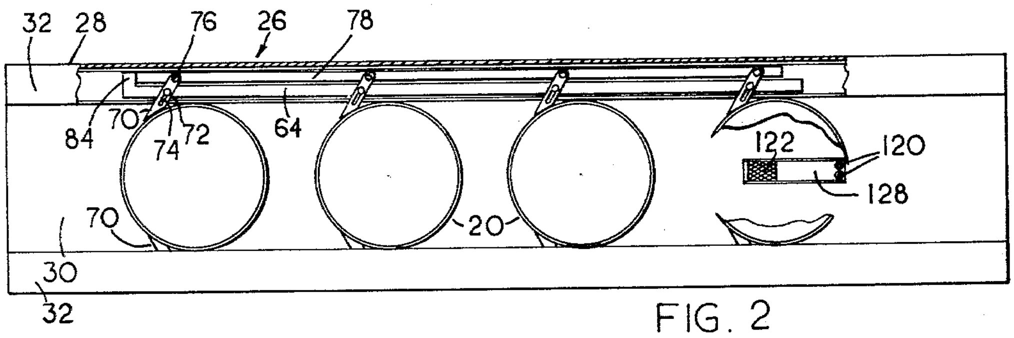
FIG. 2 is a top plan view of the conveyor of FIG. 1 with portions thereof broken away and shown in section.

Referring now in detail to the drawings, there is shown in FIGS. 1 to 13 a conveyor forming one embodiment of the invention for advancing containers 20 (FIG. 1) step-by-step to a filling position under a chute 22 adapted to discharge a measured quantity of material such as, for example, potato chips, into the container at the filling station and to advance the filled container out from under the chute 22 to a position where it may be removed from the conveyor either by an operator or by suitable known transfer means (not shown). While the container 20 is positioned under the chute at the filling station, a vibrator 24 is actuated to shake the conveyor and the container being filled to settle or pack the material supplied to the container. The conveyor includes a ratchet type advancing device 26 comprising a fixed table 28 having a generally horizontal, fixed supporting plate or top 30 along which the containers 20 may be slid by the ratchet device. The table also has rails or guides 32 defining a guideway or path for the containers 20. Each of the guides 32 comprises a downwardly facing channel member 34 (FIG. 3) having a flange portion 36, and upwardly facing channels 38 welded to flanged side members 40 of the table. The side members 40 are welded to inwardly facing channels 42 forming a portion of the supporting framework of the table and serving as supports for the table along with posts 44 (FIG. 1).

Figure 3:
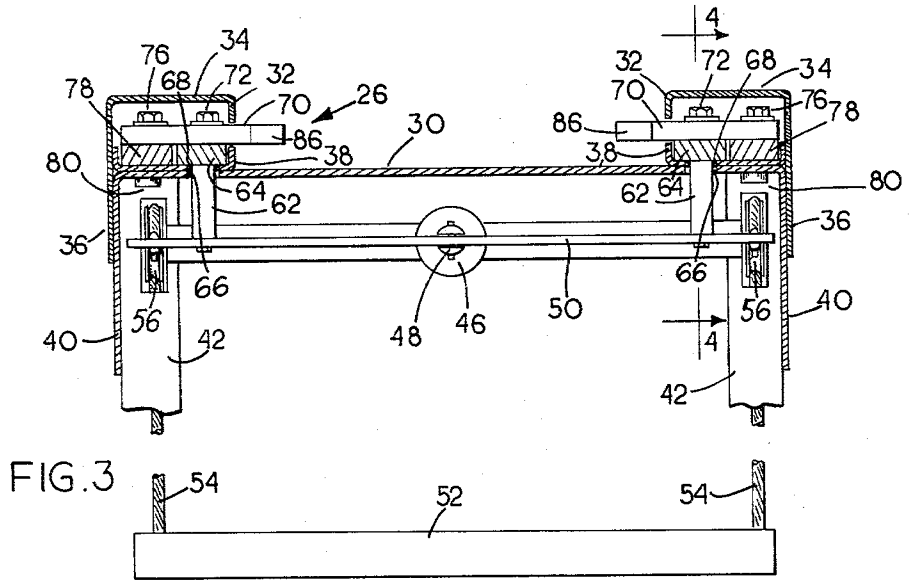
FIG. 3 is an enlarged vertical section taken along line 3—3 of FIG. 1.
Figure 7:
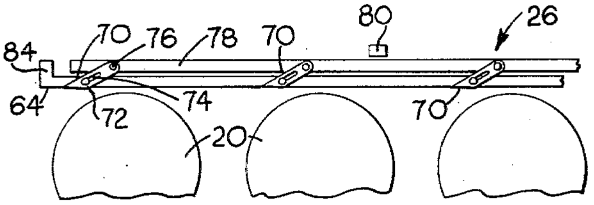
FIG. 7 is a fragmentary top plan view showing the conveyor at the end of the retraction stroke thereof.
Figure 8:
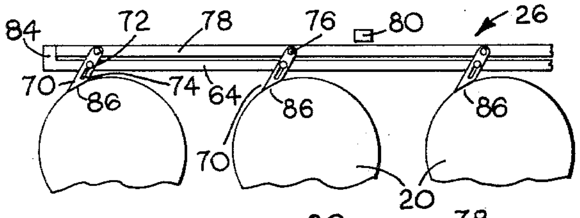
FIG. 8 is a view similar to FIG. 7 but showing the conveyor at the start of the feed stroke thereof.

The ratchet device 26 includes a pneumatic cylinder 46 with a drive piston rod 48 adapted to drive a crosshead 50 to the right, as viewed in FIG. 1, when air under pressure is supplied to the lefthand end of the cylinder 46. A counterweight 52 secured by cables 54 to the crosshead 50 is trained over guide pulleys 56 mounted rotatably on a rod 58 journaled in the channels 42. As best shown in FIG. 3, vertical spacers 62 rigidly connect the end portions of the crosshead 50 to a pair of drive bars 64 slidable in the channels 38, the spacers 62 projecting through slots 66 and 68 in the elements 30 and 38, respectively. When air under pressure is supplied to the lefthand end of the cylinder 46, as viewed in FIG. 1, the drive bars 64 are moved to the right from the fully retracted positions thereof as shown in FIG. 7, to first swing dogs 70 outwardly into extended or operative positions adapted to engage the containers 20 as shown in FIG. 8. The bars 64 swing the dogs 70 through pins 72 fixed to the drive bars 64 and slots 74 in the dogs 70. The dogs 70 are pivotally mounted on capscrew pins 76 fixedly mounted on drag bars 78. The drag bars 78 are composed of magnetic material such as, for example, steel or iron. The pins 76 project through substantially circular holes in the dogs 70 with little play being provided between the pins 76 and the dogs 70.

Figures 4, 5, 6:
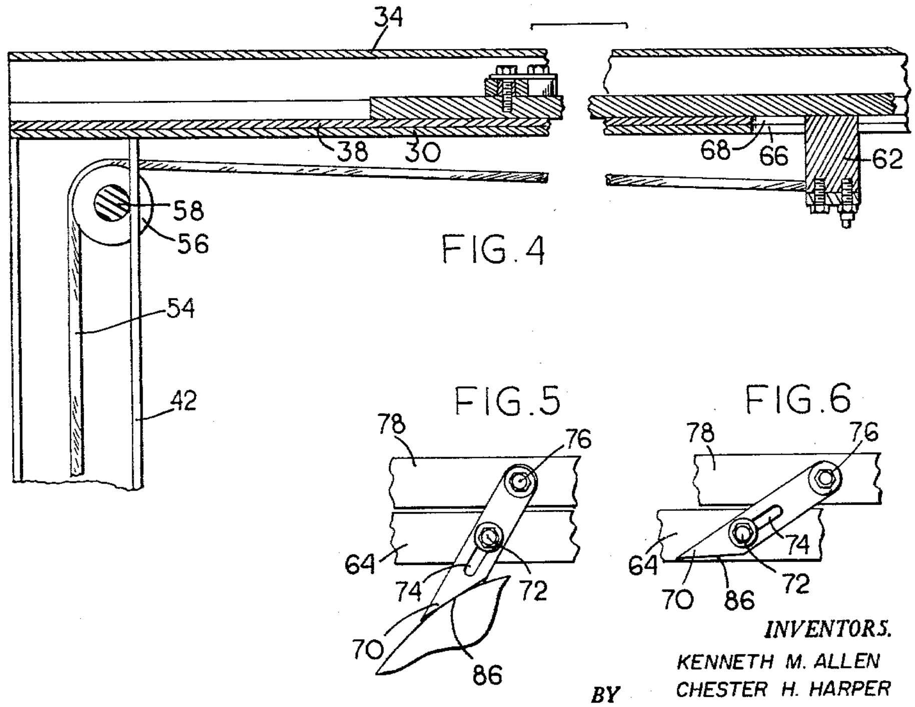
FIG. 4 is an enlarged vertical section taken along line 4—4 of FIG. 3.
FIG. 5 is an enlarged fragmentary top plan view of a ratchet portion of the conveyor of FIG. 1 in a position operable to feed a container along a predetermined path.
FIG. 6 is a view similar to FIG. 5 but during the retracting or nonfeeding stroke of the ratchet conveyor.

Permanent magnets 80 are positioned in apertures (not shown) in the conveyor table 28, as best illustrated in FIG. 3, and have surfaces in contact with the magnetic drag bars 78. The magnets are held against movement and brake movement of the drag bars 78 as the drive bars are moved to the right to swing the dogs 70 into operative, container-engaging positions as shown in FIG. 8. After the dogs 70 are swung to their operative positions, end portions 84 of the drive bars 64 engage the ends of the drag bars 78 and push the drag bars 78 to the right, and the dogs 70 push the containers 20 to the right therewith unless excessive resistance might be encountered, in which event the dogs 70 will push the drag bars 78 ahead of the drive bars 64 and move on past the containers 20 without damaging the containers 20. The dogs are provided with beveled end portions 86 generally complementary to the portions of the surfaces of the containers 20 engaged thereby when the dogs 86 are fully extended, as best illustrated in FIG. 5. The pins 72 and 76 may be capscrews which are threaded into tapped bores in the drive bars 64 and drag bars 78, respectively.

Figure 9:
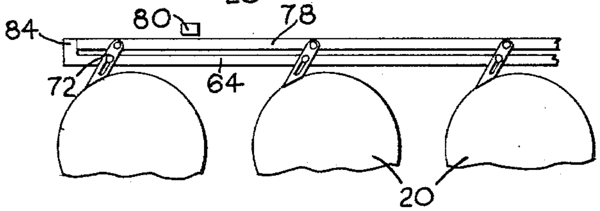
FIG. 9 is a view similar to FIG. 7 but at the end of the feed stroke thereof.
Figure 10:
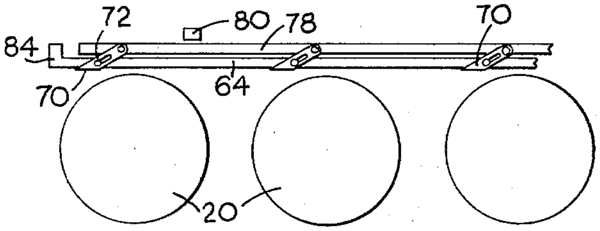
FIG. 10 is a view similar to FIG. 7 but of the conveyor during its retraction.

After the ratchet-type advancing device 26 has moved the containers 20 forward from the positions thereof shown in FIG. 7 to the positions thereof shown in FIG. 9, the air is cut off from the cylinder 46 (FIG. 1) and exhausted therefrom, and the counterweight 52 pulls the drive bars 64 in a retraction stroke back to the positions thereof shown in FIG. 7. It is apparent that the counterweight can be eliminated if a double acting cylinder is employed. During the initial portion of this movement the pins 72 first swing the dogs 70 back to their retracted positions inasmuch as the magnets 80 hold the drag bars 78 in their furthermost righthand positions until the pins 72 strike the ends of the slots 74 in the dogs 70. After this occurs, the drag bars 78 are pulled by the drive bars 64 back to the retracted positions thereof illustrated in FIG. 7.

The vibrating mechanism 24 (FIGS. 1, 11, 12 and 13) is provided to shake the container 20 under the filling chute 22 to settle the material being supplied to the container 20 and consolidate the material therein. The vibrating mechanism 24 is supported by the plate 30 through fixed bearing members 90 attached to the plate 30, and a stud 92 also fixed to the bottom of the plate 30. A U-shaped bracket 94 is secured at its upper ends to the bottom of the plate 30, and supports a pneumatic cylinder 96 having a supply line 98 connected to the lower end thereof and adapted to supply during a predetermined portion of each loading cycle air under pressure to the lower end of the cylinder 96. When the air is so supplied, the cylinder 96 through piston means (not shown) enclosed therein pushes an angular supporting plate 100 in a counter-clockwise direction, as viewed in FIG. 13, relative to a supporting shaft 102 supported by the bearings 90. The plate 100 is fixed to a sleeve 104 rotatable freely on the shaft 102 and moves a triangular cam 106 up into a position in which the lobes 107 of the cam 106 may strike a cam follower roller 110 as the cam 106 is rotated by an electric motor 108 mounted on the plate 100. The lobes 107 periodically push the roller 110 upwardly.

The roller 110 is mounted in a forked bracket 112 fixed to driving plate 114, which is carried by a sleeve 116 freely rotatable on the shaft 102. The sleeve 116 is freely rotatable relative to the shaft 102 and also is freely rotatable relative to the sleeve 104, the sleeves 104 and 116 being held against longitudinal movement relative to the shaft 102 by collars 118 (FIG. 12), which are fixed to the shaft 102, suitable known thrust means being provided between the shaft 102 and the bearings 90 to prevent longitudinal movement of the shaft 102 relative to the bearings 90. Resilient striker pads 120 are fixed to the drive plate 114 in positions relatively close to the shaft 102 of the plate 114, and a resilient striker pad 122 is fixed to the upper part of the plate 114 near the free end portion thereof. The plate 30 has a hole 126 (FIG. 11) permitting free pivotal movement of the plate 114 and through which the stud 92 projects to limit the lower movement of the drive plate 114.

As the cam 106 is rotated and strikes the roller 110, the drive plate 114 swings the resilient pads 120 and 122 up against the bottom of the container to strike the container. Then, as each lobe 107 of the cam 106 passes the roller 110 the plate 114 drops the pads 120 and 122 away from the bottom of the container preparatory to another cushioned blow against the bottom of the container as the next lobe of the cam 106 strikes the roller 110. Thus, the container 20 is shaken by the vibrating device. The top 30 has a slot 128 therein to permit the cushions 120 and 122 to move therethrough and engage the bottom of the container, the width of the slot 128 being substantially less than the diameter of the containers 20 and the slot 128 being positioned in the central part of the guideway formed by the conveyor top and the guide members 32, as illustrated best in FIG. 2.

Figure 14:
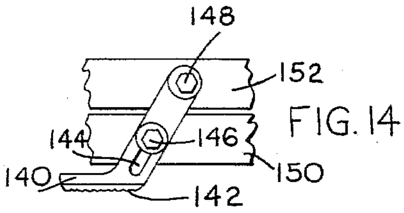
FIG. 14 is an enlarged fragmentary top plan view of a portion of a conveyor forming an alternate embodiment of the invention.
Figure 15:
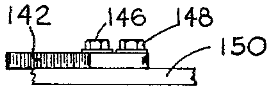
FIG. 15 is an enlarged fragmentary side elevation view of the conveyor of FIG. 14.

In FIG. 14 there is shown a ratchet type conveyor which is generally similar to the conveyor shown in FIG. 1, but which has dogs 140 different from the dogs 70 and of a type adapted to frictionally engage the sides of rectangular or box-like articles or containers to be moved along the conveyor, and the dogs 140 being positioned in laterally aligned, opposed pairs on opposite sides of the guideway so that each pair grips the object to be conveyed directly therebetween. The dogs 140 are provided with resilient roughened gripping surfaces 142 and have slots 144 therein and holes in the ends thereof opposite to the gripping surfaces 142 through which pins 146 and 148, respectively, project. The pins 146 and 148 are threaded into a drive bar 150 and a drag bar 152, respectively, corresponding to the drive bars 64 and the drag bars 78.

Figure 16:
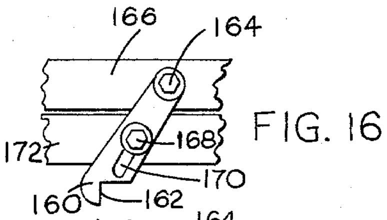
FIG. 16 is an enlarged fragmentary top plan view of a portion of a conveyor forming an alternate embodiment of the invention.
Figure 17:
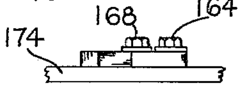
FIG. 17 is an enlarged fragmentary side elevation view of the conveyor of FIG. 16.
Figures 11, 12:
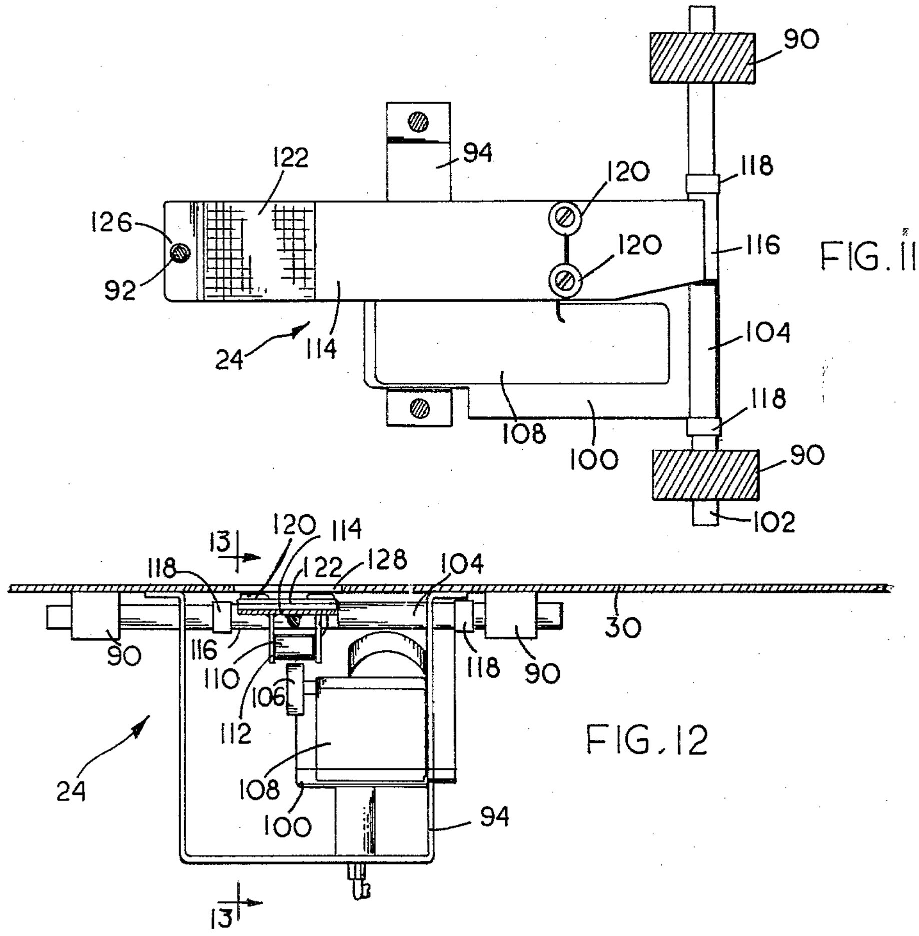
FIG. 11 is an enlarged horizontal section taken along line 11—11 of FIG. 1 and showing a vibrator of the conveyor shown in FIG. 1.
FIG. 12 is an enlarged vertical section of the conveyor of FIG. 1 taken along line 12—12 of FIG. 1.
Figure 13:
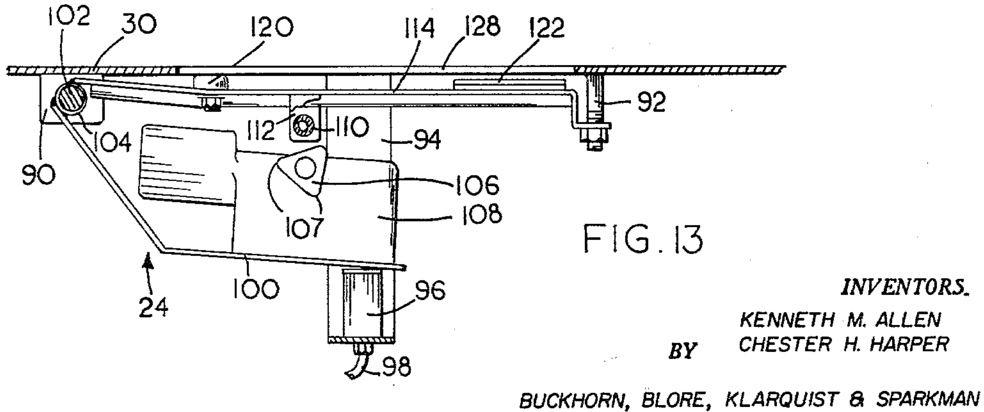
FIG. 13 is an enlarged vertical section taken along line 13—13 of FIG. 12.

In FIGS. 16 and 17 there is shown a ratchet type conveyor forming an alternate embodiment of the invention, which is generally similar to those described above but includes dogs 160 having rectangular notches 162 therein which are adapted to fit on corners of square boxes or containers to be advanced along the conveyor to the right, as viewed in FIGS. 16 and 17. The dogs 160 are pivotally mounted on capscrew pins 164 secured to drag bars 166 and are connected by capscrew pins 168 and slots 170 to a drive bar 172. The pins 168 are threaded into the drive bars. The dogs 160 are mounted on opposite sides of the conveyor in positions directly opposite to one another. When the dogs 160 are in their operative or projecting positions, they engage the rear corners of the boxes and move the boxes along the conveyor during the forward strokes of the drive bars. During the retracting or rearward strokes of the drive bars, the dogs 160 are swung first to retracted positions and then the drive bars pull the drag bars 166 back to the start positions thereof.

It is to be understood that the above-described arrangements are simply illustrative of the application of the principles of the invention. Numerous other arrangements may be readily devised by those skilled in the art which will embody the principles of the invention and fall within the spirit and scope thereof.

We claim:

1. In a conveyor, an article guiding track,
a guide extending along one side of the track,
a driving bar slidable in the guide,
a drag bar frictionally engaging and slidable in the guide alongside of the driving bar and being located in the guide at a position on the opposite side of the driving bar from the track,
a dog having a slot extending along the central portion thereof and a hole at one end thereof,
a first pin on the driving bar and projecting into the slot,
a second pin on the drag bar and projecting into the hole,
and means for reciprocating the driving bar along the guide to pull the drag bar through the dog and retract the dog from the track in movement in one direction,
the driving bar being provided with a member at one end thereof for engaging and pushing the drag bar after the dog has been swung into the track when the driving bar is moved in the direction opposite to said one direction.

2. In a conveyor, an article guiding track,
a guide extending along one side of the track,
a driving bar slidable in the portion of the guide adjacent to the track,
a drag bar frictionally engaging and slidable alongside of the driving bar on the opposite side of the driving bar from the track,
a dog having a pivot hole at one end and an article engaging portion at the other end, the dog also having a slot extending along the portion thereof between the ends thereof,
a first pin on the driving bar and extending into the slot,
a second pin on the drag bar and extending into the pivot hole,
and means for reciprocating the driving bar along the guide, the driving bar when moved in one direction serving to swing the article engaging portion of the dog over the track and when moved in the other direction serving to move the article engaging portion out of the track,
the bars being provided with means by which the driving bar pushes the drag bar after the article engaging portion has been swung over the track.

3. In a conveyor including a track,
an upwardly facing guide channel extending along one side of the track,
a first bar slidable in the channel along the portion thereof adjacent to the track,
a second bar extending along the first bar and slidable in the channel on the opposite side of the first bar from the track,
a dog having a round pivot hole at one end thereof and also having an elongated slot extending along the central portion thereof and spaced along the dog from the pivot hole,
a first pin extending through the slot and connected to the first bar,
a second pin extending through the hole and connected to the second bar,
and means for reciprocating the first bar,
the first bar having means for engaging and pushing the second bar when the dog is in a position extending over the track.

4. The conveyor of claim 3 wherein the second bar is composed of magnetic material,
and a magnet in the portion of the guide channel along which the second bar slides for resisting sliding movement of the second bar.

5. In a conveyor including a track,
a guideway extending along one side of the track,
a drive bar slidable in the guideway,
a drag bar slidable along the guideway and the drive bar,
the bars being so positioned in the guideway that the drive bar is between the drag bar and the track,
a dog having a slot extending therealong,
pin means connecting the dog pivotally to the bar remote from the track,
pin means extending through the slot and connecting the dog pivotally to the bar close to the track,
means for reciprocating the drive bar along the driveway, and means on the drive bar for positively pushing the drag bar through the drive bar when the dog is in a position extending over the track.

6. In a conveyor including a track,
a guideway extending along one side of the track,
a drive bar slidable in the guideway,
a drag bar slidable along the guideway and the drive bar,
the bars being so positioned in the guideway that the drive bar is between the drag bar and the track,
a dog having a slot extending along the central portion thereof,
pin means connecting an end of the dog pivotally to the drag bar,
pin means extending through the slot and connecting the dog pivotally to the drive bar,
means for reciprocating the drive bar along the guideway,
and means on the drive bar for positively pushing the drag bar through the drive bar when the drive bar is moved in one direction and the dog has been swung to a position extending over the track .

7. In a conveyor,
an article guiding track,
a drag bar mounted for movement back and forth along the track,
dog means pivotally connected at one end thereof to the drag bar,
a driving bar mounted for movement back and forth along the track,
means connecting the driving bar pivotally within a slot in an intermediate portion of the dog means,
means for moving the driving bar back and forth along the track to swing the dog means into the track when the driving bar is moved forwardly along the track and swing the dog means out of the track when the driving bar is moved rearwardly along the track,
connecting means operable by the driving bar for positively pushing the drag bar forwardly along the track only after the dog means have been swung into the track by the driving bar as the driving bar is moved forwardly along the track,
and means for resisting forward movement of the drag bar along the track,
said driving bar being positioned between said drag bar and said track to permit, during forward movement of the driving bar and the drag bar, forward movement of the drag bar relative to the driving bar by the dog means when the dog means encounters resistance greater than a predetermined load.

References Cited by the Examiner

UNITED STATES PATENTS

| | | | |
|---|---|---|---|
| 1,268,739 | 6/18 | Longrod | 141—78 |
| 1,435,046 | 11/22 | Birnstock | 198—221 |
| 1,560,373 | 11/25 | Birnstock | 198—221 |
| 2,583,968 | 1/52 | Rosseau | 198—221 |
| 2,789,588 | 4/57 | Huntting | 141—78 |

SAMUEL F. COLEMAN, *Primary Examiner.*

ABRAHAM BERLIN, ERNEST A. FALLER, Jr., *Examiners.*